H. J. G. KOPSCH.
COMMUTATOR.
APPLICATION FILED FEB. 2, 1918.

1,296,969.

Patented Mar. 11, 1919.

Inventor
Herman J. G. Kopsch
By
Attorney

UNITED STATES PATENT OFFICE.

HERMANN JOSEF GUSTAV KOPSCH, OF BOSTON, MASSACHUSETTS.

COMMUTATOR.

1,296,969.   Specification of Letters Patent.   Patented Mar. 11, 1919.

Application filed February 2, 1918.   Serial No. 215,145.

*To all whom it may concern:*

Be it known that I, HERMANN JOSEF GUSTAV KOPSCH, a subject of Germany, residing at Boston, county of Suffolk, Commonwealth of Massachusetts, have invented certain new and useful Improvements in Commutators, of which the following is a specification.

This invention relates to improvements in the method of and apparatus for assembling commutators. In present methods the required number of commutator bars, usually of copper, with their insulating shims, usually of mica, are cut to size and stacked by hand in a ring, usually of iron or soft steel. This iron ring with the copper and mica assembly is placed over a steel ring of a diameter slightly smaller than that of the iron ring. The assembly is now forced into the steel ring by means of any suitable press, the iron ring being slipped off during such transfer. The steel ring and its assembly is now chucked in a lathe and bored, turned and faced. The insulating bushings, clamping rings and ordinary bushings are then assembled inside of the copper and mica assembly and the whole heated and tightened, after which the steel ring is removed to be used again.

This method of assembly is open to several objections. In the first place, the steel ring is ordinarily the cause of much difficulty in assembling, owing to slight variations in the thickness of both the copper segments and the mica insulation shims, and even though these limits in thickness are kept as low as is commercially practicable, the accumulation of error in so many pieces, usually from twenty to eighty pieces of both copper segments and mica insulations, is so great as to cause the assembly to exceed the limit of elasticity of the steel ring, with the result that the steel ring must either expand or crack. Even if the steel ring does not crack, but expands sufficiently to take care of this accumulation of error, the effectiveness of the ring will be reduced, because its diameter will have been so increased as to render the ring thereafter useless for any standard size. To sum up therefore, it is highly desirable and important from a manufacturing point of view to have the limits of thickness of the copper segments and mica insulations as large as possible, but the ordinary steel assembling ring will admit of only very small limits for both.

In order to overcome the above-mentioned disadvantages, I have devised my present invention. In it I anticipate any undue radial expansive action, by providing between the assembled bars and the steel ring, flow spaces so disposed that the excess or surplus due to accumulated average over thickness of stock is taken care of by a natural flow into these spaces. In the form shown, these spaces are provided as corrugations in the face of the steel ring, but they might be formed in the copper segments. Accordingly I preferably provide a steel assembling ring internally with a series of relatively deep corrugations or grooves, preferably of a number sufficient to provide at least two teeth to bear upon each copper segment. By this construction I am enabled to eliminate excessive internal pressure which might tend to crack or expand the ring, thus not only increasing the life and accuracy of the ring, but also permitting larger limits of thickness for the copper segments and insulation, thus effecting a considerable saving in manufacturing cost.

The manner of practising my invention together with a preferred illustrative form of apparatus is shown and described in the following specification and drawings, and particularly pointed out in the appended claims. Throughout the specification and drawings like reference characters are correspondingly employed, and in the drawings:

I have indicated at 1 a plurality of segments of copper or other suitable material constituting the commutator bars and at 2 the insulating shims which may conveniently be made of mica.

Figure 1:
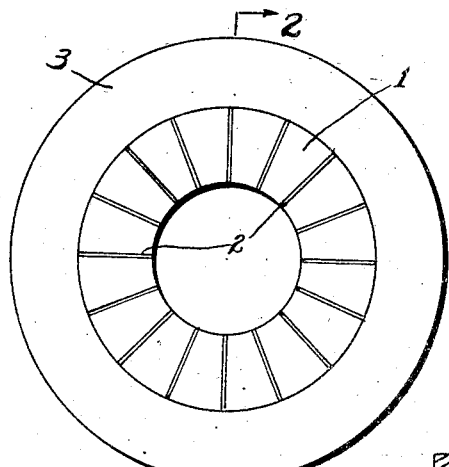
Figure 1 is a face view of the commutator bars and their insulating shims stacking within the usual iron ring.
Figure 2:
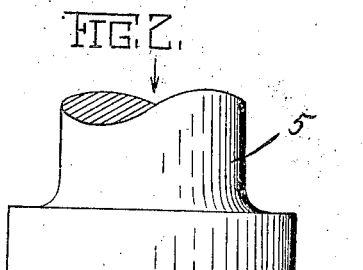
Fig. 2 is a view illustrating the manner of transferring the copper and mica assembly from the iron ring to the corrugated steel ring, the iron and steel rings being shown in section, and the section of the iron ring being taken on a plane through the mica insulating shims.

In practising my invention the copper segments and mica shims is first stacked by hand in an iron ring 3, after which the iron ring is positioned over a corrugated steel ring 4 and the copper and mica assembly transferred from the iron ring into the steel ring, by any suitable press 5 as shown in Fig. 2.

The ring 4 is preferably made of a very tough alloy steel and has an annular internal series of relatively deep corrugations 6 providing alternate grooves and ribs, the arrangement preferably being such that at least two ribs bear upon every segment. The depth and number and shape of corrugations may be varied as desired, according to the type of commutator to be made. The rings 4 are made to be a press fit for the size of the desired commutator, as determined by the number of the copper segments and insulating shims, the thickness of both the segments and shims being taken at the lowest permissible thickness. If either the copper segments or the insulating shims, or both, have either standard size or the largest permissible size, the deep grooves of the corrugated ring permit the copper to readily "flow" into the grooves, so that excessive pressure will be eliminated and the ring will not crack or expand. Thus I increase the life of the ring by avoiding its being cracked or expanded, besides permitting larger limits in thickness for both the copper segments and insulating shims, which as is apparent produces a considerable saving in the cost of manufacturing the commutators.

Figure 3:
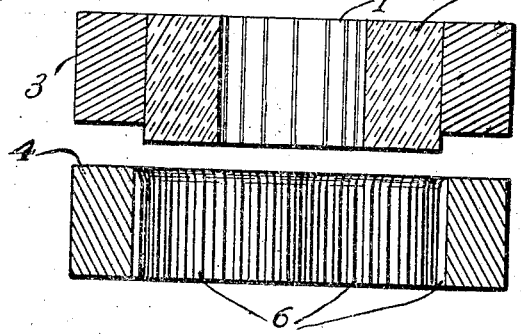
Fig. 3 is a face view showing the copper and mica assembly transferred to the corrugated steel ring after the lathe operations have been performed.
Figure 3:
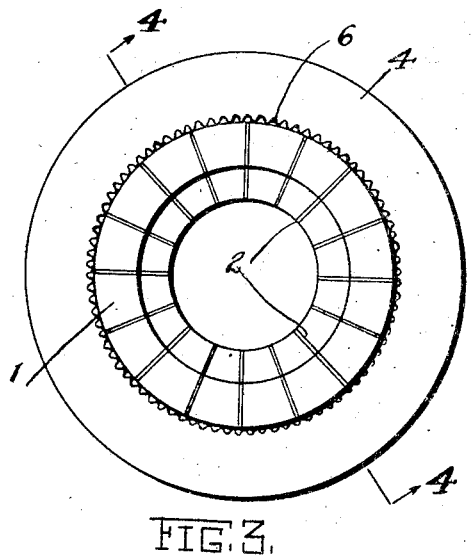
Figure 4:
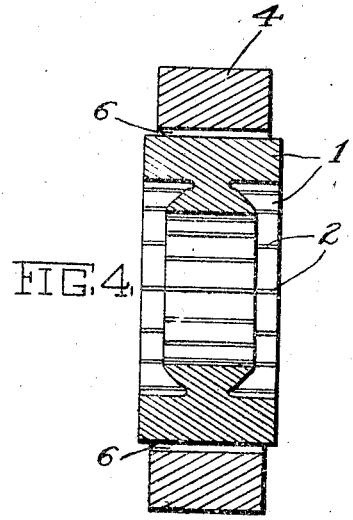
Fig. 4 is a section on the line 4—4 of Fig. 3.

The assembled commutator ring is then chucked in a lathe and machined, as shown in Figs. 3 and 4. The bushings, insulating rings and clamping rings are now applied, and the whole assembly is placed in an oven and heated to an approximate temperature of 300° F. to expel all moisture, and finally tightened. The corrugated ring may now readily be removed for use over and over again.

While I have shown and described my invention in its application to the assembly of commutators, and while it has been found in practice to be very valuable in such use it will be understood that this application of my invention may be considered as illustrative, and that the invention may be used in any capacity where it will satisfactorily perform its intended functions.

Various modifications in the method of and apparatus for practising my invention may obviously be resorted to, if within the limits of the appended claims.

What I therefore claim and desire to secure by Letters Patent is:

1. That step in the method of assembling a plurality of elements, which consists in transferring the assembled elements from a preliminary holder to another holder having an internal annular series of grooves into which the material at the periphery of the assembled elements may expand.

2. That step in the method of assembling a plurality of segments, which consists in transferring the assembled segments from a preliminary holder to a ring having a series of corrugations on its inner face into which the material at the periphery of the assembled segments may expand.

3. That step in the method of assembling commutator segments and their insulating shims, which consists in transferring the assembled segments and shims from a preliminary ring into another ring having an internal annular series of axial alternate grooves and ribs into which grooves the material at the periphery of the assembled elements may expand.

4. The method of assembling commutator segments and their insulating shims which consists in forcing a stack of segments and shims into a ring while providing between said ring and the edge of said stack radial relief spaces for the accommodation of the material at the periphery of the assembled elements.

In testimony whereof I affix my signature in presence of two witnesses.

HERMANN JOSEF GUSTAV KOPSCH.

Witnesses:
 MARY P. WOTHERSPOON,
 VICTORIA LOWDEN.